US009348651B2

(12) United States Patent
Archer et al.

(10) Patent No.: US 9,348,651 B2
(45) Date of Patent: *May 24, 2016

(54) CONSTRUCTING A LOGICAL TREE TOPOLOGY IN A PARALLEL COMPUTER

(71) Applicant: International Business Machines Corporation, Armonk, NY (US)

(72) Inventors: Charles J. Archer, Hillsboro, OR (US); Nysal Jan K. A., Bangalore (IN); Sameh S. Sharkawi, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/098,162

(22) Filed: Dec. 5, 2013

(65) Prior Publication Data

US 2015/0160965 A1    Jun. 11, 2015

(51) Int. Cl.
*G06F 9/46* (2006.01)
*G06F 9/50* (2006.01)
*H04L 12/751* (2013.01)
*H04L 29/08* (2006.01)

(52) U.S. Cl.
CPC .............. *G06F 9/50* (2013.01); *G06F 9/5061* (2013.01); *G06F 9/5066* (2013.01); *G06F 9/5088* (2013.01); *H04L 45/02* (2013.01); *H04L 67/10* (2013.01); *H04L 67/1004* (2013.01)

(58) Field of Classification Search
CPC .............................................. G06F 9/46–9/548
See application file for complete search history.

(56) References Cited

U.S. PATENT DOCUMENTS

| 8,117,288 | B2* | 2/2012 | Bhanot | G06F 9/5066 709/201 |
| 2004/0010667 | A1* | 1/2004 | Brenner | G06F 9/5088 711/158 |
| 2010/0149983 | A1* | 6/2010 | Lee | H04L 12/189 370/235 |
| 2012/0151292 | A1* | 6/2012 | Rowstron et al. | 714/748 |
| 2012/0185867 | A1* | 7/2012 | Archer | G06F 9/5044 718/105 |
| 2012/0246660 | A1* | 9/2012 | Jackson | 718/104 |
| 2012/0254879 | A1* | 10/2012 | Chung | G06F 9/5066 718/102 |
| 2013/0085993 | A1* | 4/2013 | Li et al. | 707/636 |

(Continued)

OTHER PUBLICATIONS

Vikranth, B., et al., "Topology Aware Task stealing for On-Chip NUMA Multi-Core Processors", 2013, pp. 379-388.*

(Continued)

*Primary Examiner* — Thuy Dao
*Assistant Examiner* — Christopher Franco
(74) *Attorney, Agent, or Firm* — Edward J. Lenart; Feb Cabrasawan; Kennedy Lenart Spraggins LLP

(57) ABSTRACT

Constructing a logical tree topology in a parallel computer that includes compute nodes, where each node executes a number of tasks and at least one node executes a number of tasks different from another node includes: identifying a compute node executing a greatest number of tasks; selecting, as a global root, a task from the identified compute node, including assigning the task as a local root of the identified compute node and assigning each of the other tasks of the identified compute node as a child of the local root; selecting, from each of the other compute nodes, one task to be a local root, including assigning each task other than the local root as a child of the local root; and assigning each local root of the other compute nodes to be a child of one of the tasks of the identified compute node other than the global root.

10 Claims, 14 Drawing Sheets

(56) References Cited

U.S. PATENT DOCUMENTS

| | | | |
|---|---|---|---|
| 2013/0239121 A1* | 9/2013 | Rossi et al. | 718/106 |
| 2013/0298130 A1* | 11/2013 | Pienaar | G06F 9/4887 718/102 |
| 2013/0346988 A1* | 12/2013 | Bruno | G06F 9/5066 718/102 |
| 2015/0049644 A1* | 2/2015 | Lee | H04W 72/0446 370/256 |
| 2015/0143381 A1* | 5/2015 | Chin | G06F 9/485 718/104 |

OTHER PUBLICATIONS

Srivastava, Anurag, et al., "Parallel Formulations of Decision-Tree Classication Algorithms", 1999, pp. 1-24.*

Sinnen, Oliver, "Task Scheduling for Parallel Systems", 2007, pp. 1-16.*

Scott, Michael L., "Encyclopedia of Parallel Computing: Synchronization", 2011, pp. 1989-1996.*

Perez, Josep M., "Handling Task Dependencies Under Strided and Aliased References", 2010, pp. 263-274.*

Savvas, Ilias K., et al., "Efficient Load Balancing on Irregular Network Topologies Using B+tree Structures", 2007, pp. 1-8.*

Kandalla, et al., "Designing Multi-Leader Based Allgather Algorithms for Multi-Core Clusters", International Symposium on Parallel & Distributed Processing (IPDPS 2009), May 2009, 8 pp., IEEE Computer Society, USA, DOI: 10.1109/IPDPS.2009.5160896.

Graham, et al., "MPI Support for Multi-Core Architectures: Optimized Shared Memory Collectives", Recent Advances in Parallel Virtual Machine and Message Passing Interface—Proceedings of the 15$^{th}$ European PVM/MPI Users' Group Meeting, Dublin, Ireland, Sep. 2008, pp. 130-140, Lecture Notes in Computer Science Series, vol. 5205, Springer Berlin Heidelberg New York.

* cited by examiner

CONSTRUCTING A LOGICAL TREE TOPOLOGY IN A PARALLEL COMPUTER

BACKGROUND OF THE INVENTION

1. Field of the Invention

The field of the invention is data processing, or, more specifically, methods, apparatus, and products for constructing a logical tree topology in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

In some parallel computers, each compute node may execute one or more tasks—a process of execution for a parallel application. Each task may include a number of endpoints. Each endpoint is a data communications endpoint that supports communications among many other endpoints and tasks. In this way, endpoints support collective operations in a parallel computer by supporting the underlying message passing responsibilities carried out during a collective operation. In some parallel computers, each compute node may execute a single task including a single endpoint. For example, a parallel computer that operates with the Message Passing Interface ('MPI') described below in more detail may execute a single rank on each compute node of the parallel computer. In such implementations, the terms task, endpoint, and rank are effectively synonymous.

In embodiments in which multiple compute nodes each execute multiple tasks, symmetric multiprocessing techniques may be utilized to achieve better collective communication performance. In such collectives, data is transferred through shared memory amongst tasks within each SMP-based compute node and through switch networks between nodes. One task one each node may be configured is a local root or a 'node leader'. Such a local root may be responsible for inter-node communication with one or more other local root tasks. There is typically one node leader per SMP-based compute node where the node leader can handle only one transfer at a single time.

With multiple networks or multiple adaptors available to tasks, further performance improvements are possible by carrying out inter-node communications concurrently with the help of shared memory. The idea is to let m (where m>1) tasks per node participate in inter-node communication concurrently. Shared memory buffers are at the core of this approach. Tasks exchange data and synchronize with other tasks on the same node to cooperate on future inter-node communication. After the intra-node exchange, each task on a node acts as an inter-node leader to a subgroup of nodes. This type of algorithms may be referred to as a high radix algorithm which improves scaling of MPI collectives on large scale systems. However, multi-leader collectives at this time are restricted to having a constant m tasks per node on all nodes participating in the collective operation.

SUMMARY OF THE INVENTION

Methods, apparatus, and products for constructing a logical tree topology in a parallel computer are disclosed in this specification. The parallel computer may include a plurality of compute nodes, with each compute node executing a number of tasks. In some embodiments, at least one of the compute nodes executes a number of tasks that is different than the number of tasks executed by another one of the compute nodes. In such a parallel computer, constructing a logical tree topology may include: identifying a compute node executing a greatest number of tasks; selecting, as a global root, a task from the identified compute node, including assigning the task as a local root of the identified compute node and assigning each of the other tasks of the identified compute node as a child of the local root; selecting, from each of the other compute nodes, one task to be a local root, including assigning each task other than the local root as a child of the local root; and assigning each local root of the other compute nodes to be a child of one of the tasks of the identified compute node other than the global root.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
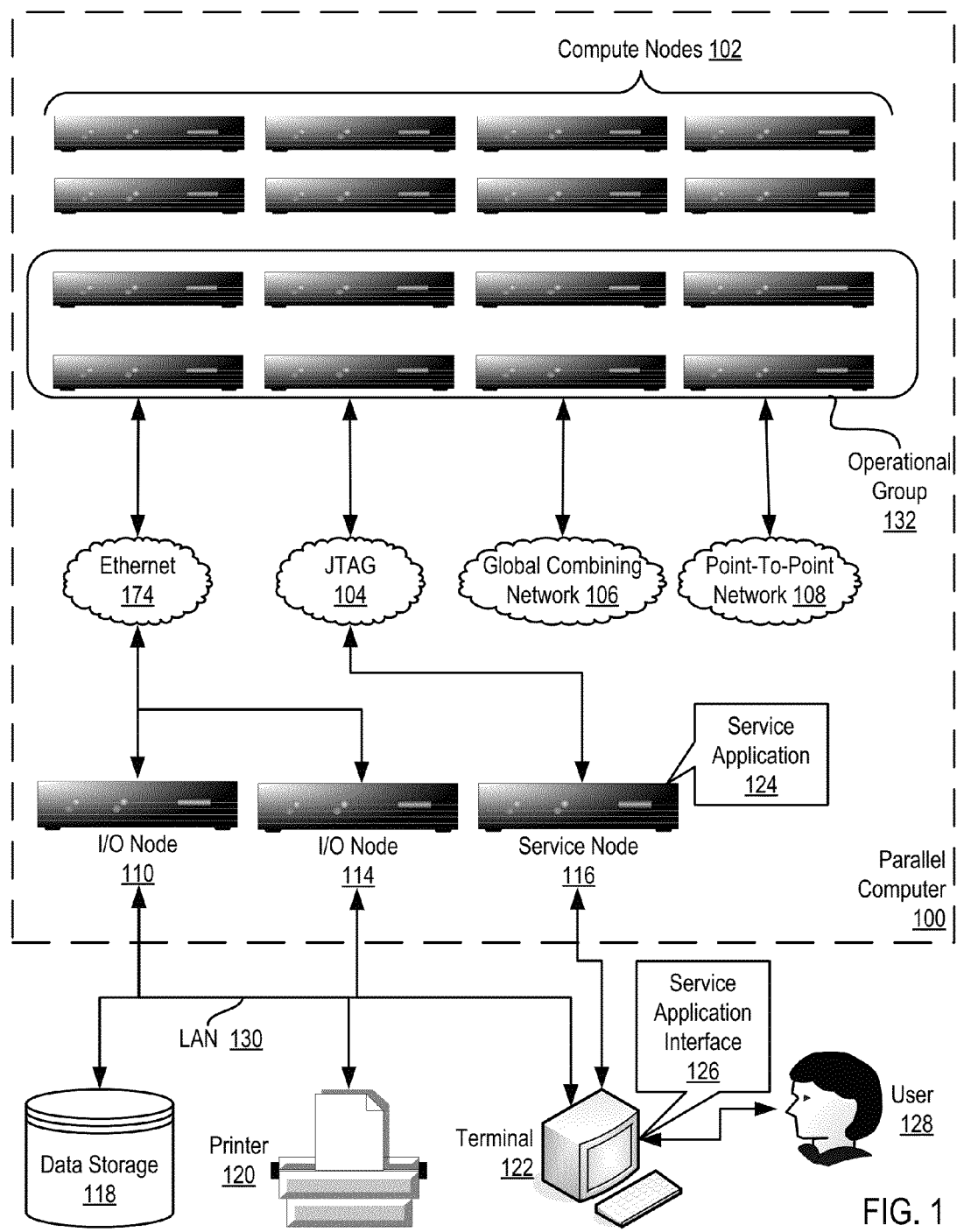
FIG. 1 illustrates an exemplary system for constructing a logical tree topology in a parallel computer according to embodiments of the present invention.

Exemplary methods, apparatus, and products for constructing a logical tree topology in a parallel computer in accordance with the present invention are described with reference to the accompanying drawings, beginning with FIG. 1. FIG. 1 illustrates an exemplary system for constructing a logical tree topology in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for constructing a logical tree topology in a parallel computer in accordance with embodiments of the present invention. As mentioned above, some parallel application may be split into parallel processes or parallel tasks. For simplicity in this specification a single compute node is often described as executing a single task. Readers will understand however that a compute node may execute in any number of tasks. In the example of FIG. 1, each compute node (102) may execute a number of tasks where at least one of the compute nodes executes a number of tasks that is different than the number of tasks executed by another one of the compute nodes.

In such an embodiment, a logical tree topology of the tasks may be constructed (for use in collective communication or operations) during establishment of an operational group (such as an MPI communicator) of the tasks. Such a logical tree topology may be constructed in accordance with embodiments of the present invention by first, identifying, by a process configured to establish the operational group, a compute node executing a greatest number of tasks. Then, the group establishing process may select, as a global root of the tree, a task from the identified compute node. The group establishing process may also assign the selected task as a local root of the identified compute node while assigning each of the other tasks of the identified compute node as a child of the local root. That is, the global root task for the entire tree spanning all tasks in all nodes is also configured as a local root in a high radix tree of tasks within the compute node upon which the root is executing. Then, the group establishing process may select, from each of the other compute nodes in the operational group, one task to be a local root and assign each task other than the local root as a child of the local root. That is, each compute node is configured with a local root tasks which operates as a root of a high radix tree within the compute node where the leaf nodes of the high radix tree are the other tasks executing on the compute node.

Finally, the group establishing task may complete construction of the tree by assigning each local root of the other compute nodes to be a child of one of the tasks of the identified compute node other than the global root. Here, each task other than the global root task of the compute node identified as having the greatest number of tasks is established as a parent with a single child, that single child being a local root of one of the other compute nodes. Such an example tree is described below in further detail with respect to FIGS. 6-11.

Constructing a logical tree topology according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of constructing a logical tree topology according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
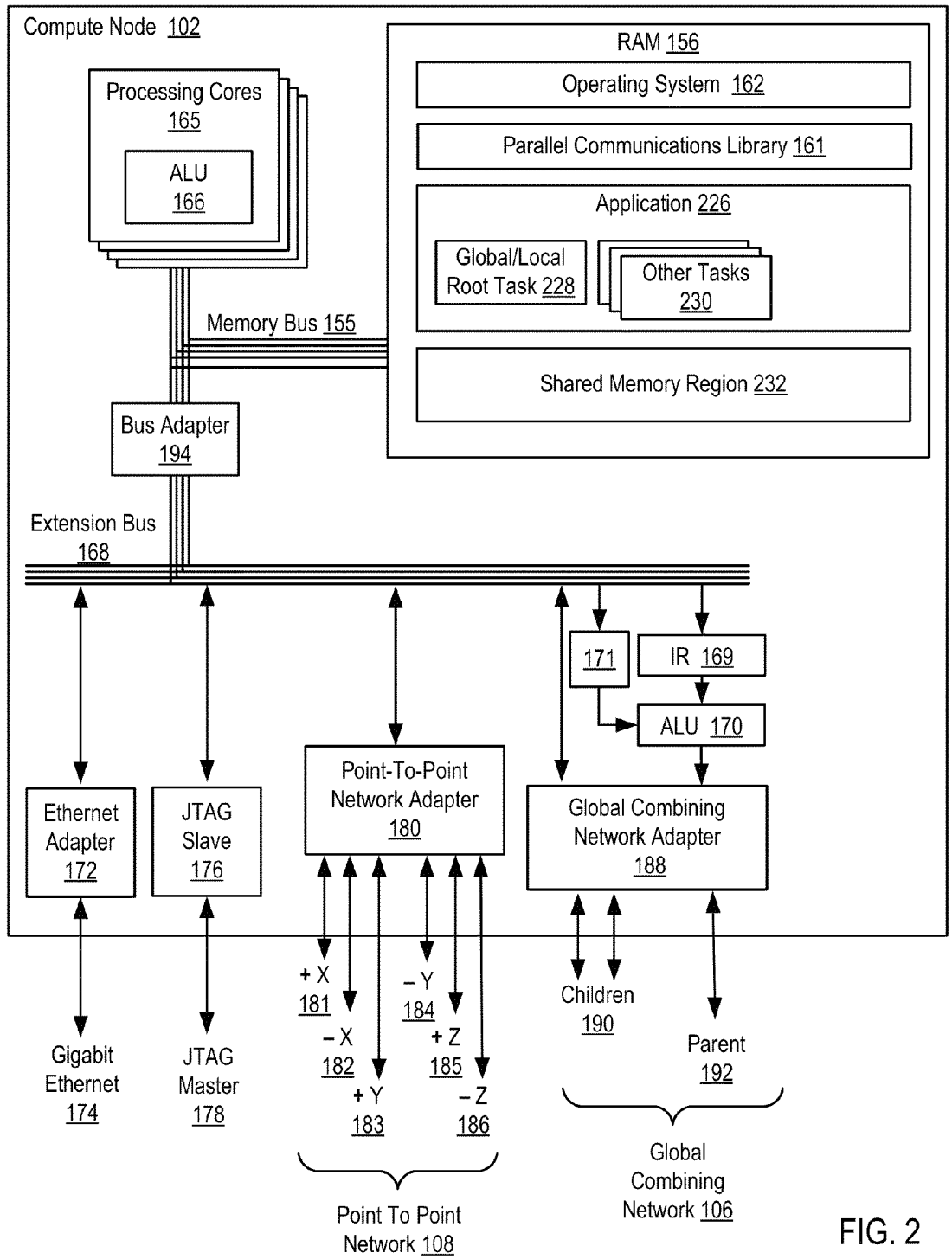
FIG. 2 sets forth a block diagram of an example compute node useful in a parallel computer capable of constructing a logical tree topology according to embodiments of the present invention.

In the example of FIG. 2, the parallel communications library (161) is also configured to constructing a logical tree topology with tasks in the parallel computer, where each compute node executes a number of tasks and at least one compute node executes a number of tasks that is different than the number of tasks executed by another one of the compute nodes. In the example of FIG. 2, the parallel communications library (161) may construct such a logical tree topology by identifying a compute node (102) executing a greatest number of tasks (228, 230). The parallel communications library (161) may also select, as a global root, a task from the identified compute node. In the example of FIG. 2, the task (228) may be selected as a global root for the entire tree of tasks to be established. In selecting the global root, the library (161) may also assign the task as a local root (228) of the identified compute node (102) and assign each of the other tasks (230) of the identified compute node as a child of the local root.

Then, the parallel communications library (161) may select, from each of the other compute nodes, one task to be a local root and assign each task other than the local root as a child of the local root. The parallel communications library (161) may then assign each local root of the other compute nodes to be a child of one of the tasks (230) of the identified compute node other than the global root.

Once the logical tree topology is constructed, the tasks may carry out collective operations. In a broadcast operation, for example, the global task (228) may utilize a shared memory region (232) to broadcast data to each of the other tasks (230) of the compute node. Then, each of the other tasks (230) may broadcast, in parallel to one another, the data to the local root task of another compute node that is assigned as the task's (230) child. Then, the local root task of each of the other compute nodes may utilize a shared memory region on that compute node to broadcast the data to each of the other tasks executing on that compute node.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for constructing a logical tree topology in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for constructing a logical tree topology in a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
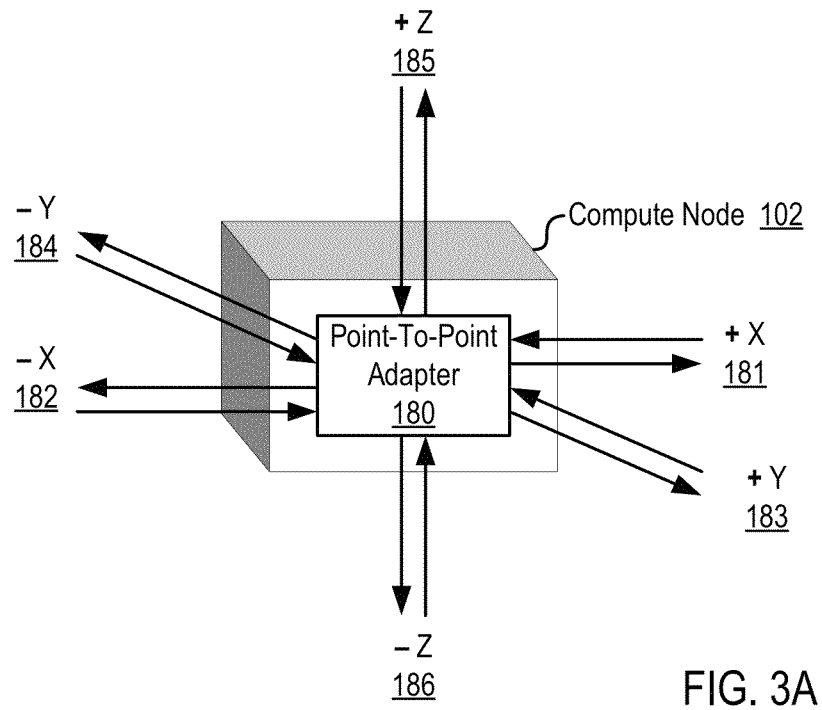
FIG. 3A sets forth a block diagram of an example Point-To-Point Adapter useful in systems for constructing a logical tree topology in a parallel computer according to embodiments of the present invention.

For further explanation, FIG. 3A sets forth a block diagram of an example Point-To-Point Adapter (180) useful in systems for constructing a logical tree topology in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
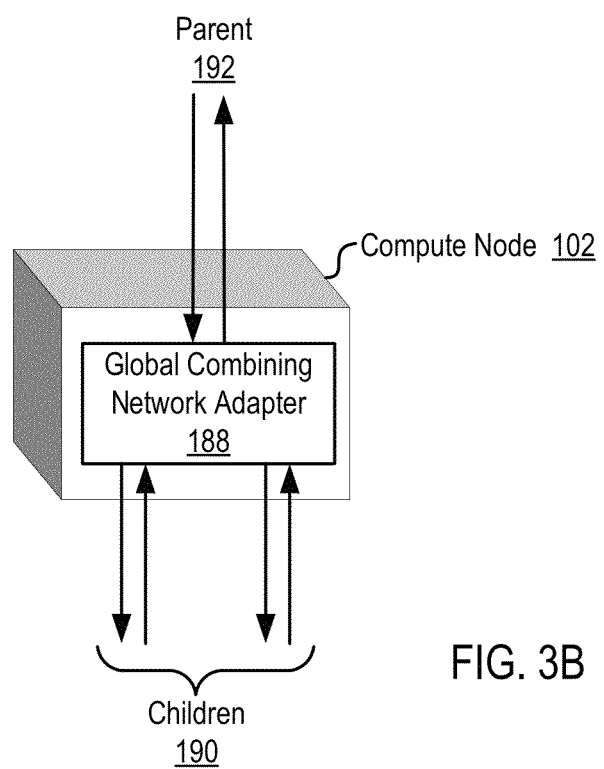
FIG. 3B sets forth a block diagram of an example Global Combining Network Adapter useful in systems for constructing a logical tree topology in a parallel computer according to embodiments of the present invention.

For further explanation, FIG. 3B sets forth a block diagram of an example Global Combining Network Adapter (188) useful in systems for constructing a logical tree topology in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
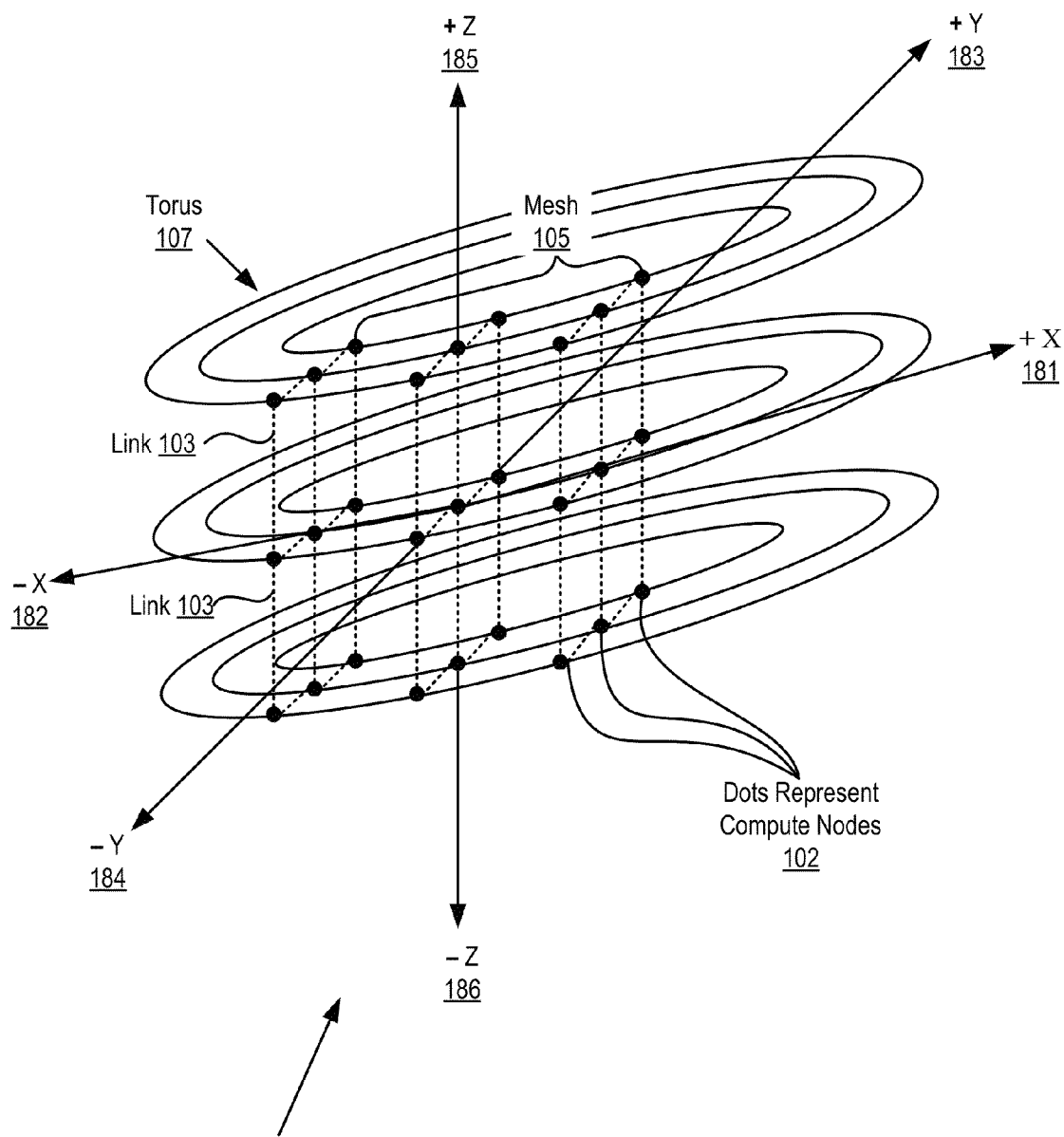
FIG. 4 sets forth a line drawing illustrating an example data communications network optimized for point-to-point operations useful in systems capable of constructing a logical tree topology in a parallel computer according to embodiments of the present invention.

For further explanation, FIG. 4 sets forth a line drawing illustrating an example data communications network (108) optimized for point-to-point operations useful in systems capable of constructing a logical tree topology in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in constructing a logical tree topology in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in constructing a logical tree topology in a parallel computer in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
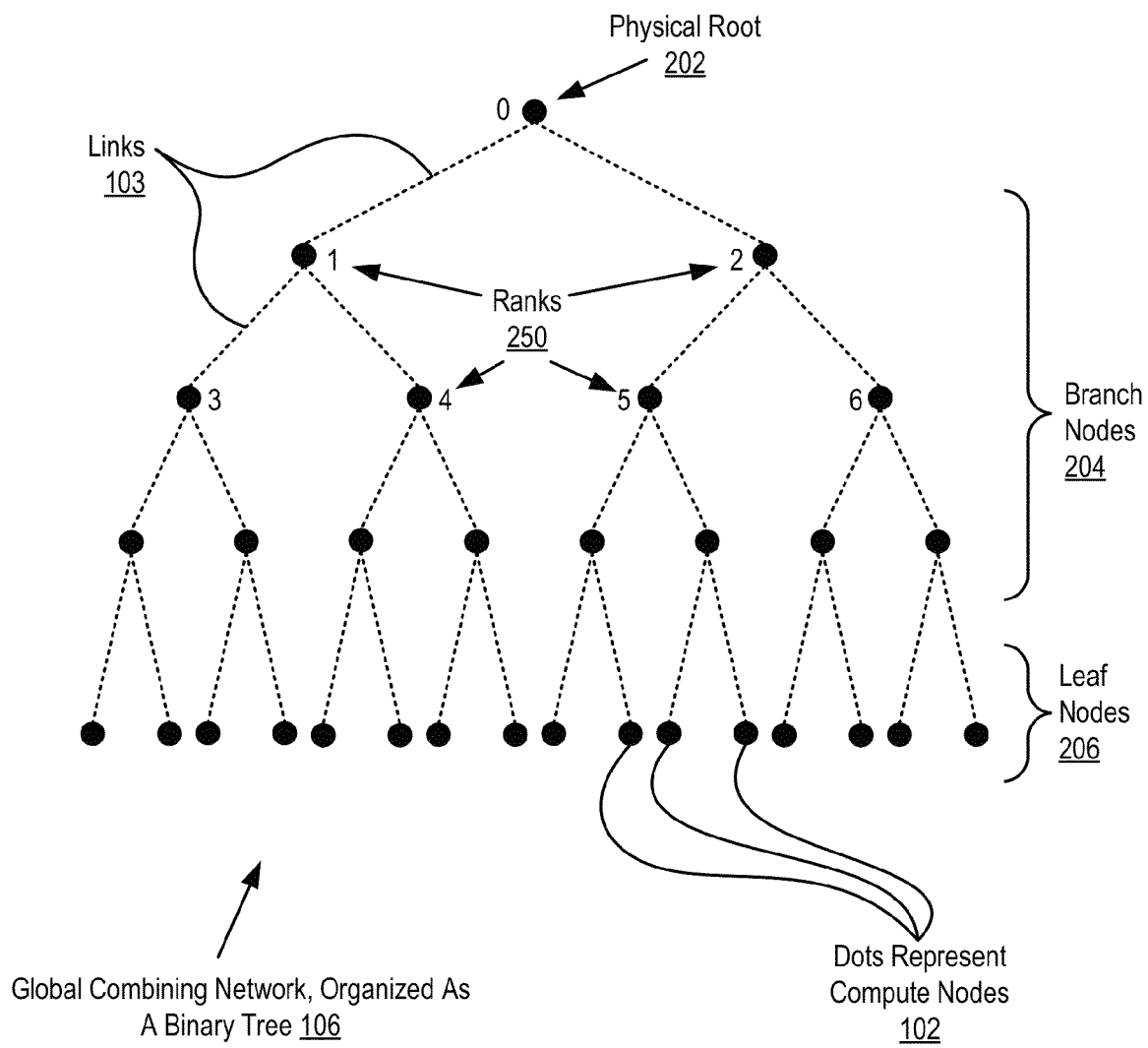
FIG. 5 sets forth a line drawing illustrating an example global combining network useful in systems capable of constructing a logical tree topology in a parallel computer according to embodiments of the present invention.

For further explanation, FIG. 5 sets forth a line drawing illustrating an example global combining network (106) useful in systems capable of constructing a logical tree topology in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in constructing a logical tree topology in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
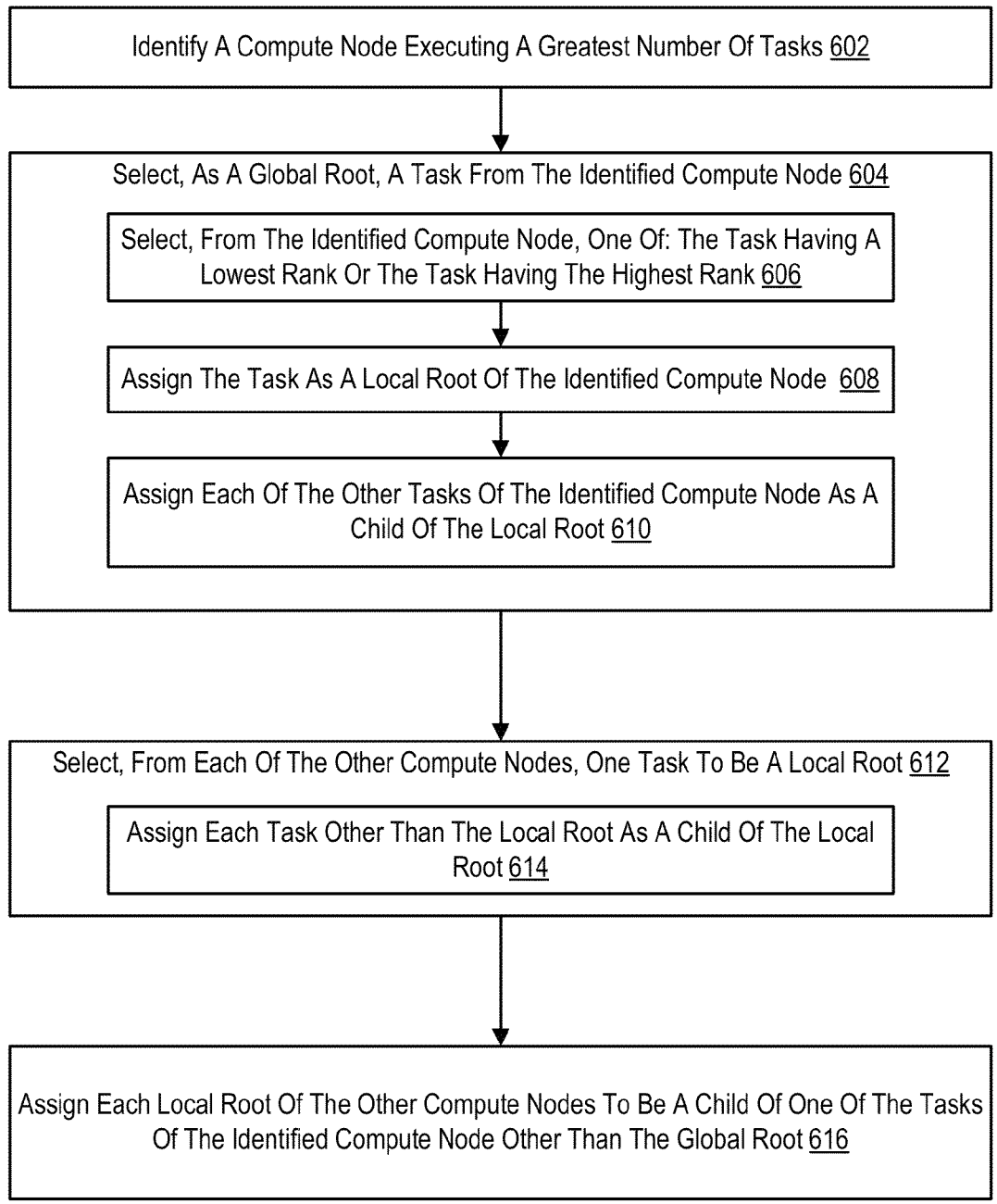
FIG. 6 sets forth a flow chart illustrating an example method for constructing a logical tree topology in a parallel computer according to embodiments of the present invention.

For further explanation, FIG. 6 sets forth a flow chart illustrating an example method constructing a logical tree topology in a parallel computer according to embodiments of the present invention. The method of FIG. 6 may be carried out in a parallel compute similar that in FIG. 1 that includes compute nodes similar to that in FIG. 2. In the method of FIG.

6, each compute node is executing a number of tasks, where at least one compute node executes a number of tasks that is different than the number of tasks executed by another one of the compute nodes.

Figure 7:
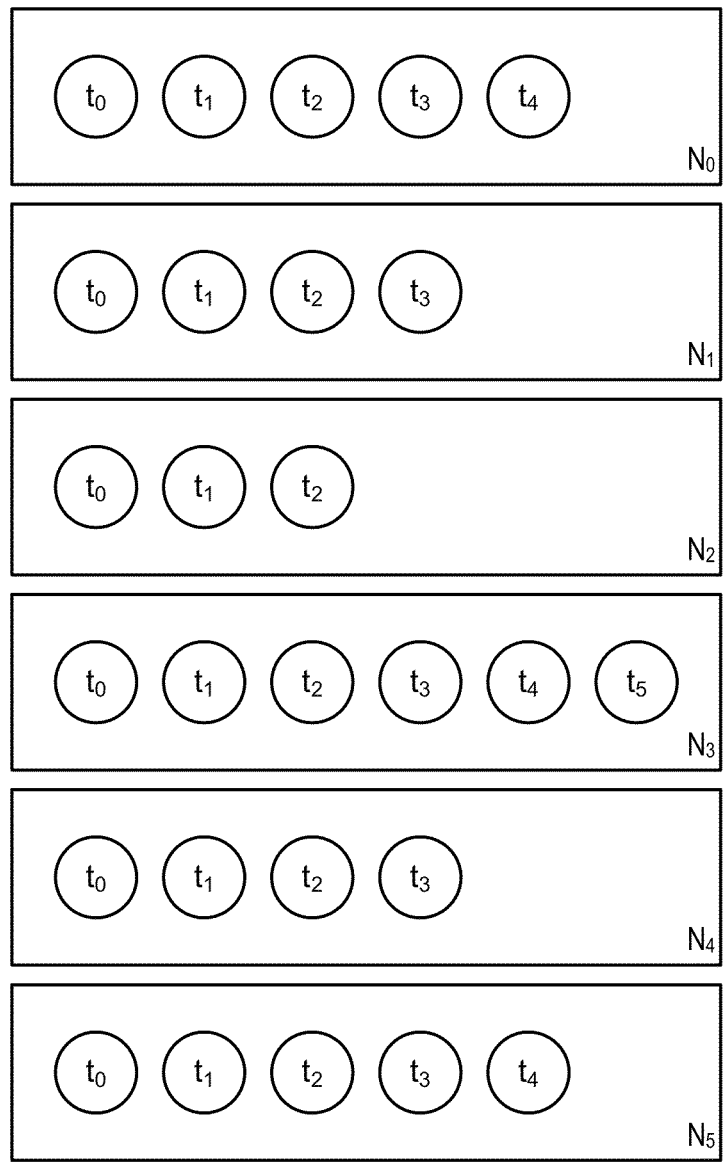
FIG. 7 sets forth a block diagram of an example system of compute nodes and tasks in a parallel computer for which logical tree topology is constructed according to embodiments of the present invention.
Figure 8:
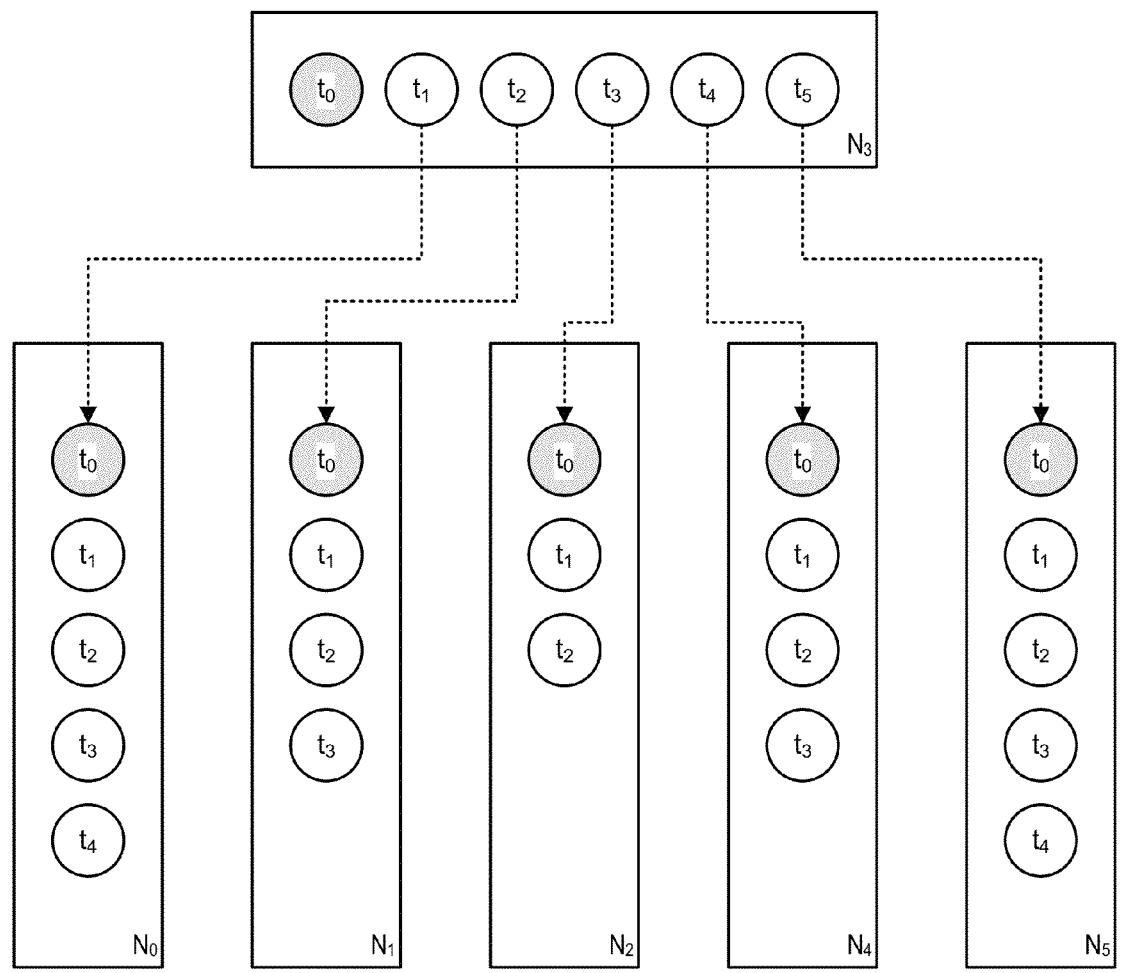
FIG. 8 sets forth a block diagram of the example system of FIG. 7 in which the logical tree topology is constructed according to embodiments of the present invention.

For ease of explanation, the method of FIG. 6 is described with reference also to FIG. 7 and FIG. 8. FIG. 7 sets forth a block diagram of an example system of compute nodes and tasks in a parallel computer for which logical tree topology is constructed according to embodiments of the present invention. FIG. 8 sets forth a block diagram of the example system of FIG. 7 in which the logical tree topology is constructed according to embodiments of the present invention.

The method of FIG. 6 includes identifying (602) a compute node ($N_3$) executing a greatest number of tasks. Consider, as an example, the compute nodes ($N_0$-$N_5$) of FIG. 7. Compute node $N_0$ is executing five tasks ($t_0$-$t_4$), compute node $N_1$ is executing four tasks ($t_0$-$t_3$), compute node $N_2$ is executing three tasks ($t_0$-$t_2$), compute node $N_3$ is executing six tasks ($t_0$-$t_5$), compute node $N_4$ is executing four tasks ($t_0$-$t_3$), compute node $N_5$ is executing five tasks ($t_0$-$t_4$). Identifying (602) a compute node executing a greatest number of tasks may be carried out by sorting the nodes in descending order in dependence upon the number of tasks executing on the nodes. In the example of FIG. 7, compute node $N_3$ is identified as the compute node having the greatest number of tasks.

The method of FIG. 6 also includes selecting (604), as a global root, a task from the identified compute node. In the method of FIG. 6, selecting (604) a task from the identified compute node as a global root includes selecting (606), from the identified compute node, one of: the task having a lowest rank or the tasks having the highest rank. In some embodiments, such as those in which the parallel computer supports MPI, the tasks may be identified by a rank or other identification. Selecting a particular task from the compute node having the greatest number of tasks executing on the compute node may be carried out in dependence upon the assigned ranks of the tasks. In some embodiments, a task having the lowest rank may be selected by as the global root task. In other embodiments, the task having the highest rank may be selected. In the example system of FIG. 8, the task having a lowest rank is selected as a global root. In FIG. 8, task $t_0$ of compute node $N_3$ is selected as the global root of the tree topology.

Also in the method of FIG. 6, selecting (604) a task from the identified compute node as a global root may include assigning (608) the task as a local root of the identified compute node and assigning (610) each of the other tasks of the identified compute node as a child of the local root. Such a configuration is often referred to as a high radix tree. That is, a high radix tree refers to a tree in which any parent may be configured with more than two children. There is no limitation to two children as in a binary tree.

The method of FIG. 6 continues by selecting (612), from each of the other compute nodes, one task to be a local root and assigning (614) each task other than the local root as a child of the local root. Selecting one task from each of the other compute nodes to be a local root may be carried out in a manner similar to that of the global root—by selecting a task being one of: a lowest rank or a highest rank. In the example of FIG. 8, the task from each compute node having the lowest rank is selected as a local root.

The method of FIG. 6 continues by assigning (616) each local root of the other compute nodes to be a child of one of the tasks of the identified compute node other than the global root. In the example of FIG. 8, the arrow with the dashed line represents the assignment of parent and child. In that example, task $t_1$ of compute node $N_3$ is assigned to be a parent of task $t_0$ of compute node $N_0$, task $t_2$ of compute node $N_3$ is assigned to be a parent of task $t_0$ of compute node $N_1$, task $t_3$ of compute node $N_3$ is assigned to be a parent of task $t_0$ of compute node $N_2$, task $t_4$ of compute node $N_3$ is assigned to be a parent of task $t_0$ of compute node $N_4$, and task $t_5$ of compute node $N_3$ is assigned to be a parent of task $t_0$ of compute node $N_5$.

The method of FIG. 6 may be carried out upon establishment of an operational group of the tasks. In this way, the construction of the logical tree topology does not affect the performance of a collective operation that relies on that topology.

Figure 9:
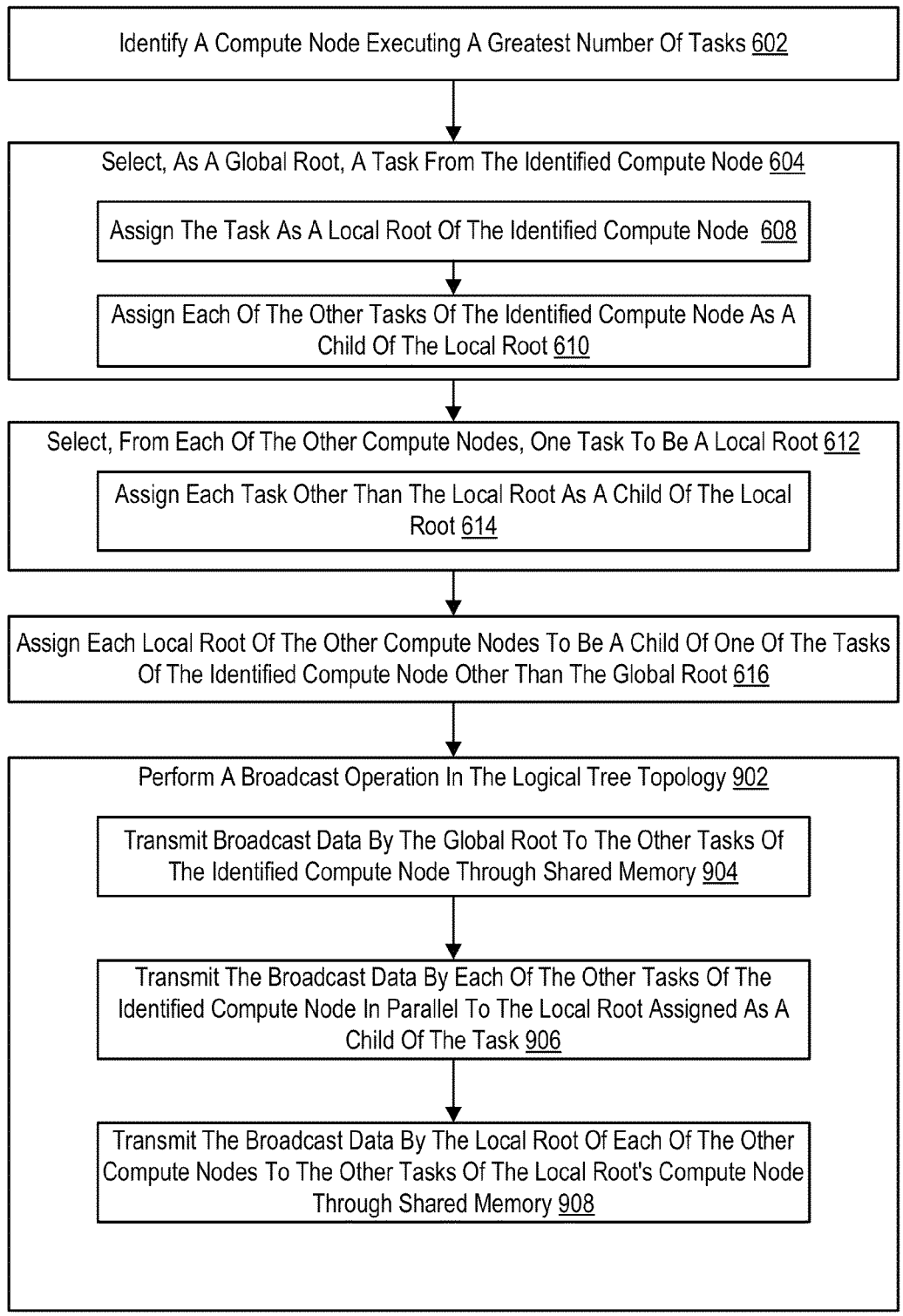
FIG. 9 sets forth a flow chart illustrating another example method for constructing a logical tree topology in a parallel computer according to embodiments of the present invention.

For further explanation, FIG. 9 sets forth a flow chart illustrating another example method for constructing a logical tree topology in a parallel computer according to embodiments of the present invention. The method of FIG. 9 is similar to the method of FIG. 6 in that the method of FIG. 9 is carried out in a parallel computer that includes a plurality of compute nodes, where each compute node executes a plurality of tasks and at least one of the compute nodes executes a different number of tasks than another compute node. The method of FIG. 9 also includes: identifying (602) a compute node executing a greatest number of tasks; selecting (604) a task from the identified compute node as a global root; assigning (608) the task as a local root; assigning (610) each of the other tasks as a child of the local root; selecting (612) one task from each of the other compute nodes to be a local root; assigning (614) each task other than the local root as a child; and assigning (616) each local root of the other compute nodes to be a child of one of the tasks of the identified compute node other than the global root.

Figure 10:
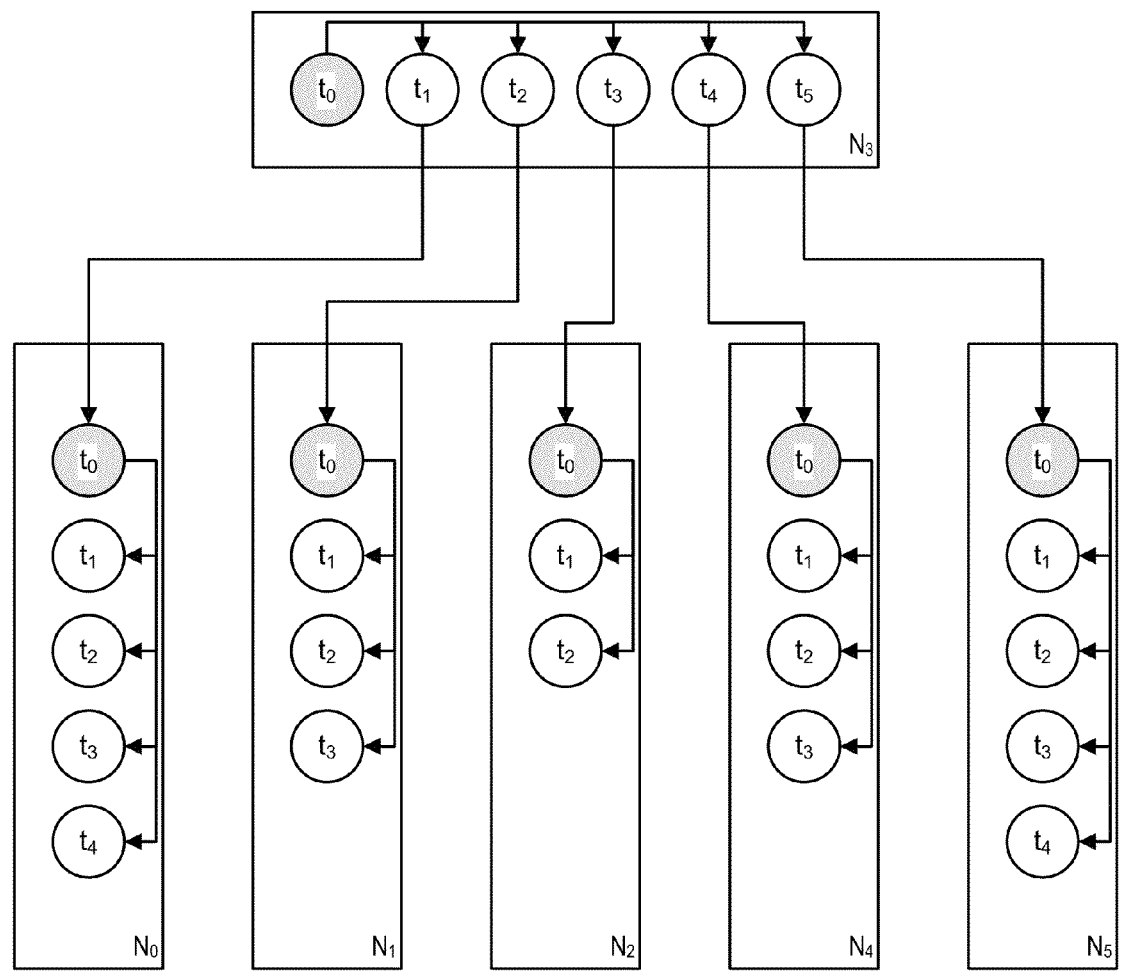
FIG. 10 sets forth a block diagram of the example logical tree topology of FIG. 8 in which a broadcast operation is performed according to embodiments of the present invention.

The method of FIG. 9 differs from the method of FIG. 6, however, in that the method of FIG. 9 includes performing (902) a broadcast operation in the logical tree topology. An example of such a broadcast operation is depicted in FIG. 10. FIG. 10 sets forth a block diagram of the example logical tree topology of FIG. 8 in which a broadcast operation is performed according to embodiments of the present invention. To that end, the method of FIG. 9 will be described with reference to the example of FIG. 10.

In the example of FIG. 9, performing (902) a broadcast operation in the logical tree topology includes transmitting (904) broadcast data by the global root ($t_0$ of compute node $N_3$) to the other tasks ($t_1$-$t_5$ of compute node $N_3$) of the identified compute node ($N_3$) through shared memory. In this role, the global root effectively operates as the local root of the compute node, broadcasting data to all of the tasks local to the compute node.

In the method of FIG. 9, performing (902) a broadcast operation in the logical tree topology also includes transmitting (906) the broadcast data by each of the other tasks ($t_1$-$t_5$ of compute node $N_3$) of the identified compute node ($N_3$) in parallel to the local root ($t_0$ of compute node $N_0$, $N_1$, $N_2$, $N_4$, and $N_5$) assigned as a child of the task, Performing (902) a broadcast operation in the local tree topology also in the method of FIG. 9 also includes transmitting (908) the broadcast data by the local root ($t_0$ of compute node $N_0$, $N_1$, $N_2$, $N_4$, and $N_5$) of each of the other compute nodes to the other tasks of the local root's compute node through shared memory.

Figure 11:
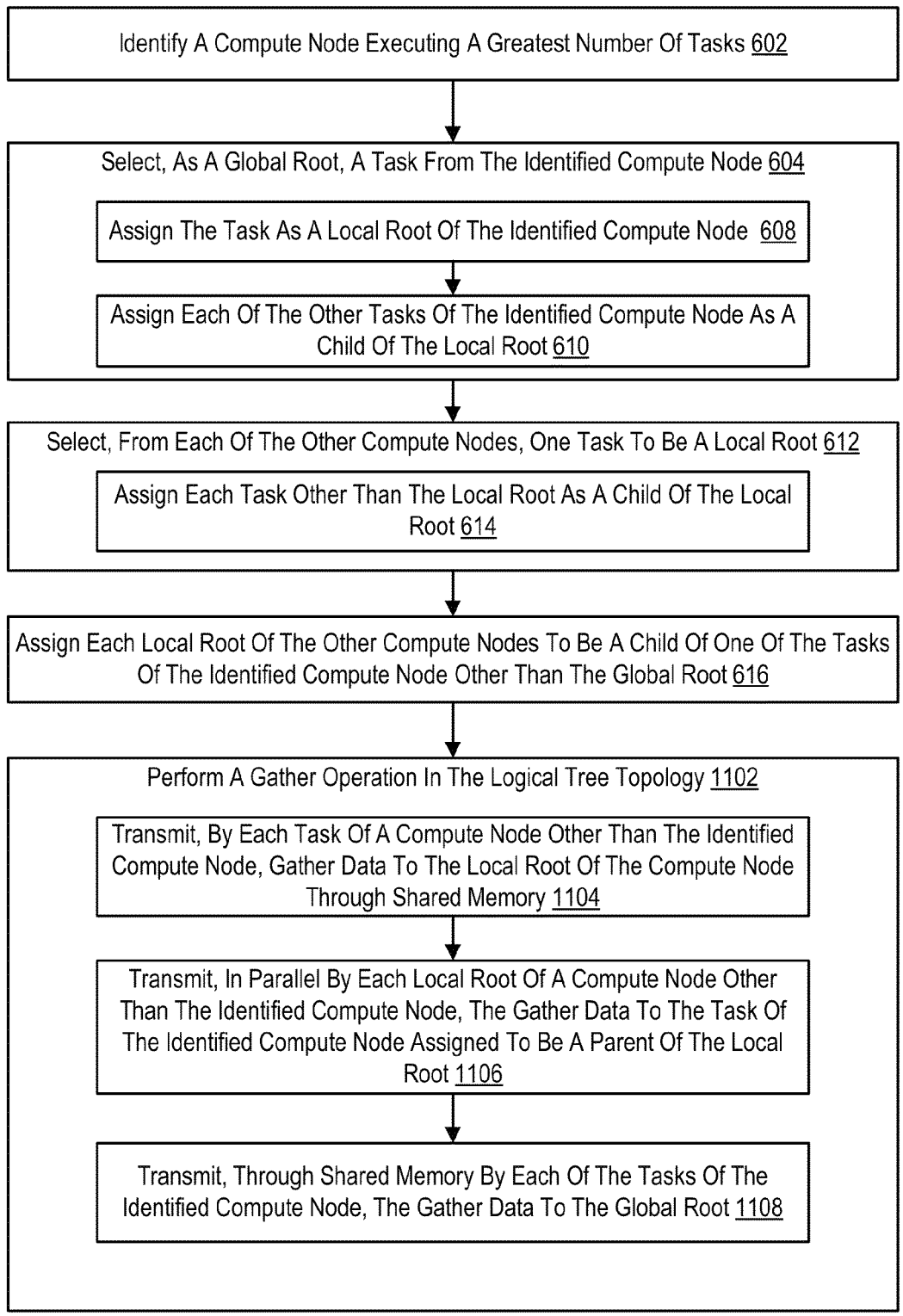
FIG. 11 sets forth a flow chart illustrating another example method for constructing a logical tree topology in a parallel computer according to embodiments of the present invention.

For further explanation, FIG. 11 sets forth a flow chart illustrating another example method for constructing a logical tree topology in a parallel computer according to embodiments of the present invention. The method of FIG. 11 is similar to the method of FIG. 6 in that the method of FIG. 11 is carried out in a parallel computer that includes a plurality of compute nodes, where each compute node executes a plurality of tasks and at least one of the compute nodes executes a different number of tasks than another compute node. The method of FIG. 11 also includes: identifying (602) a compute node executing a greatest number of tasks; selecting (604) a task from the identified compute node as a global root; assigning (608) the task as a local root; assigning (610) each of the other tasks as a child of the local root; selecting (612) one task from each of the other compute nodes to be a local root; assigning (614) each task other than the local root as a child; and assigning (616) each local root of the other compute nodes to be a child of one of the tasks of the identified compute node other than the global root.

Figure 12:
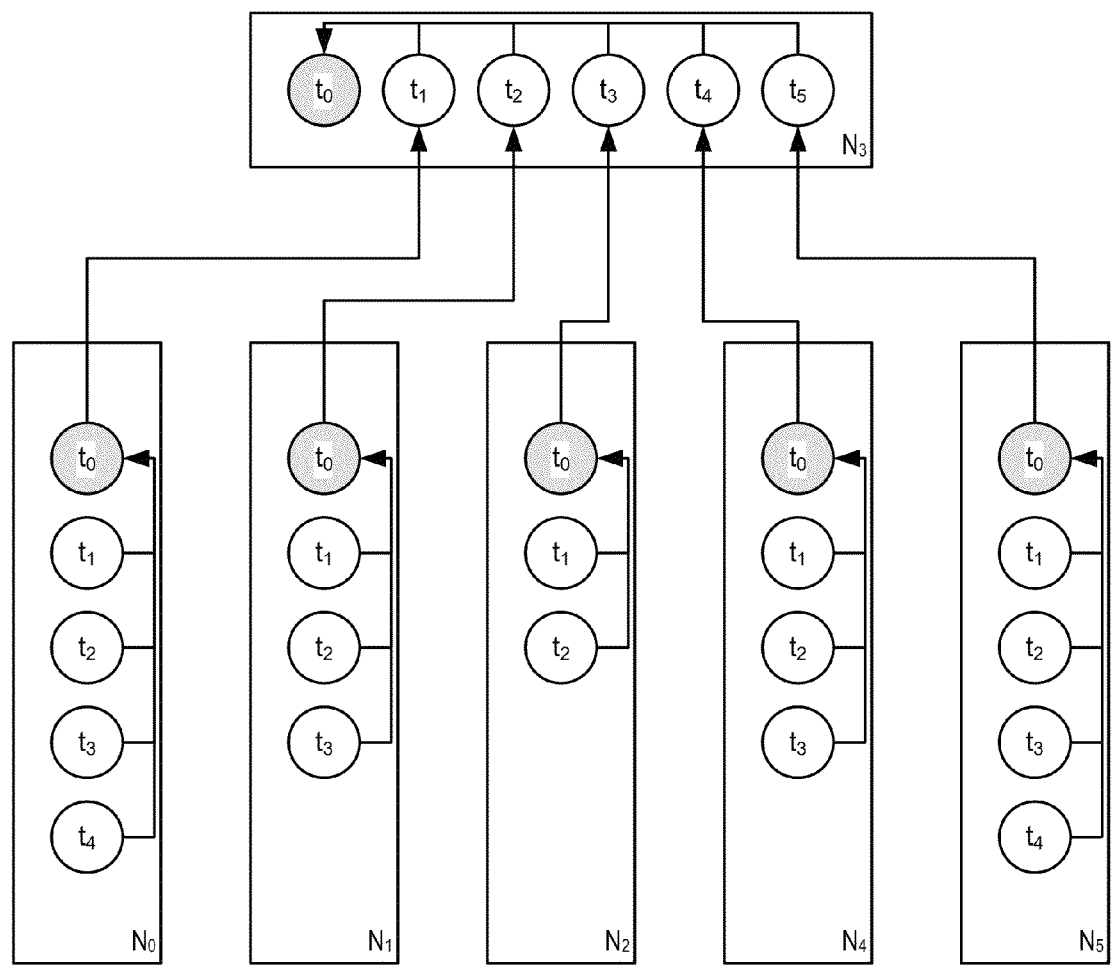
FIG. 12 sets forth a block diagram of the example logical tree topology of FIG. 8 in which a gather operation is performed according to embodiments of the present invention.

The method of FIG. 11 differs from the method of FIG. 6, however, in that the method of FIG. 11 includes performing (1102) a gather operation in the logical tree topology. An example of such a gather operation is depicted in FIG. 12. FIG. 12 sets forth a block diagram of the example logical tree topology of FIG. 8 in which a gather operation is performed according to embodiments of the present invention. To that end, the method of FIG. 11 will be described with reference to the example of FIG. 12.

Performing (1102) a gather operation in the method of FIG. 11 includes transmitting (1104), by each task of a compute node other than the identified compute node (compute nodes $N_0$, $N_1$, $N_2$, $N_4$, and $N_5$), gather data to the local root ($t_0$ of compute node $N_0$, $N_1$, $N_2$, $N_4$, and $N_5$) of the compute node through shared memory.

Performing (1102) a gather operation in the method of FIG. 11 also includes transmitting (1106), in parallel by each local root ($t_0$ of compute node $N_0$, $N_1$, $N_2$, $N_4$, and $N_5$) of a compute node other than the identified compute node, the gather data to the task of the identified compute node assigned to be a parent of the local root. In the example of FIG. 12, task $t_0$ of compute node $N_0$ transmits gather data to the task $t_1$ of compute node $N_3$, task $t_0$ of compute node $N_1$ transmits gather data to the task $t_2$ of compute node $N_3$, task $t_0$ of compute node $N_2$ transmits gather data to the task $t_3$ of compute node $N_3$, task $t_0$ of compute node $N_4$ transmits gather data to the task $t_4$ of compute node $N_3$, and task $t_0$ of compute node $N_5$ transmits gather data to the task $t_5$ of compute node $N_3$.

Performing (1102) a gather operation in the method of FIG. 11 continues by transmitting (1108), through shared memory by each of the tasks ($t_1$-$t_5$) of the identified compute node $N_3$, the gather data to the global root ($t_0$).

Figure 13:
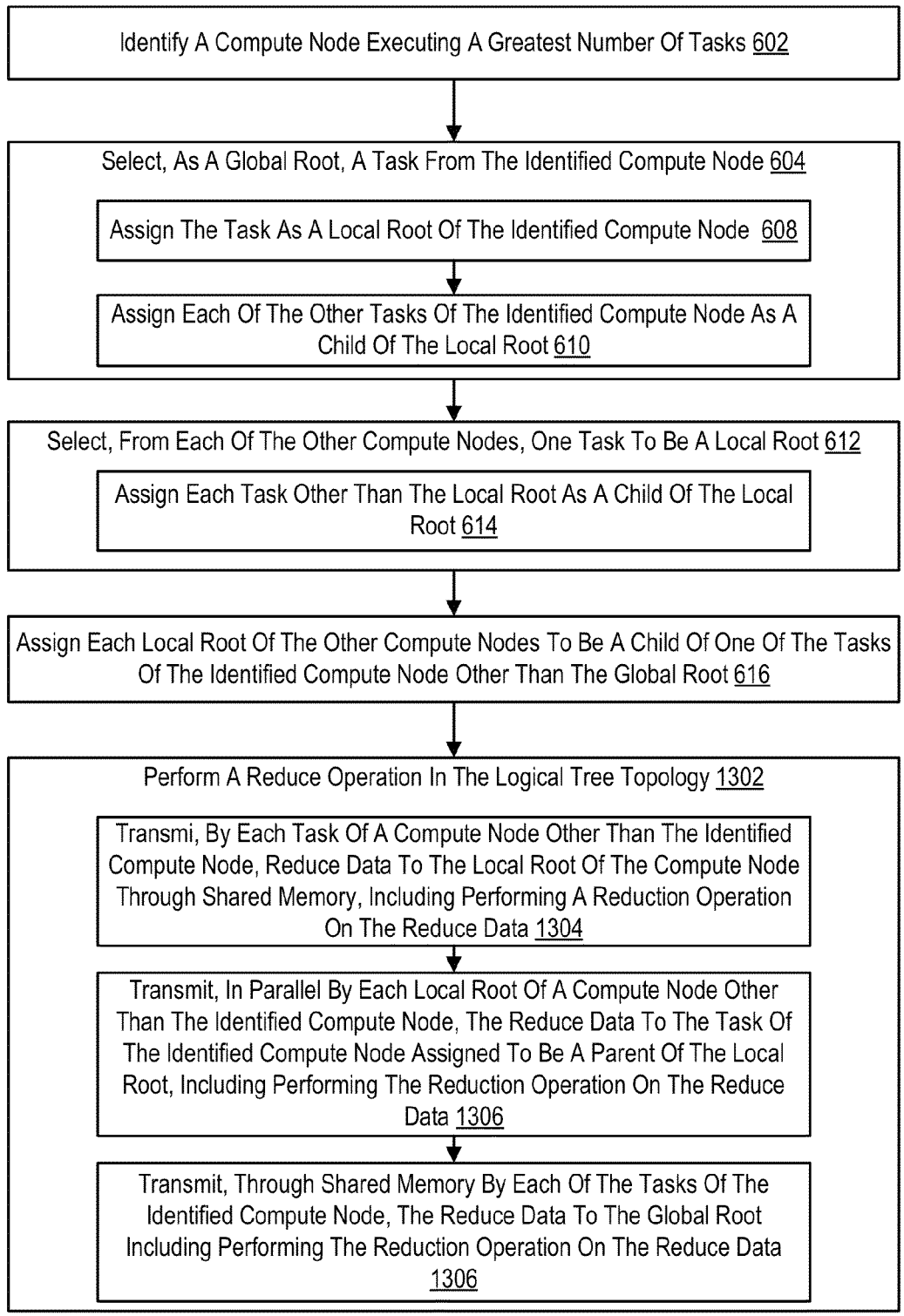
FIG. 13 sets forth a flow chart illustrating another example method for constructing a logical tree topology in a parallel computer according to embodiments of the present invention.

For further explanation, FIG. 13 sets forth a flow chart illustrating another example method for constructing a logical tree topology in a parallel computer according to embodiments of the present invention. The method of FIG. 13 is similar to the method of FIG. 6 in that the method of FIG. 13 is carried out in a parallel computer that includes a plurality of compute nodes, where each compute node executes a plurality of tasks and at least one of the compute nodes executes a different number of tasks than another compute node. The method of FIG. 13 also includes: identifying (602) a compute node executing a greatest number of tasks; selecting (604) a task from the identified compute node as a global root; assigning (608) the task as a local root; assigning (610) each of the other tasks as a child of the local root; selecting (612) one task from each of the other compute nodes to be a local root; assigning (614) each task other than the local root as a child; and assigning (616) each local root of the other compute nodes to be a child of one of the tasks of the identified compute node other than the global root.

The method of FIG. 13 differs from the method of FIG. 6, however, in that the method of FIG. 13 includes performing (1302) a reduce operation in the logical tree topology. An example of such a gather operation is depicted in FIG. 14.

Figure 14:
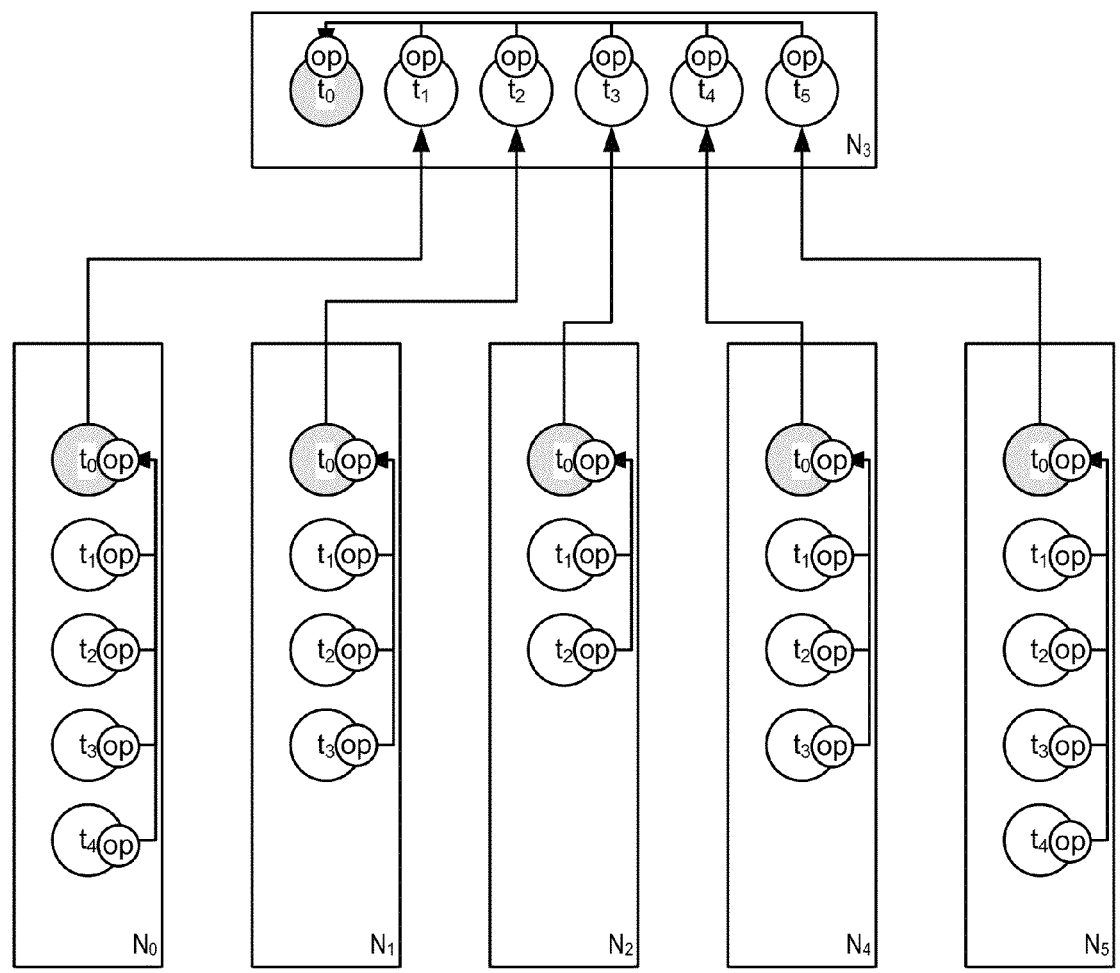
FIG. 14 sets forth a block diagram of the example logical tree topology of FIG. 8 in which a reduce operation is performed according to embodiments of the present invention.

FIG. 14 sets forth a block diagram of the example logical tree topology of FIG. 8 in which a reduce operation is performed according to embodiments of the present invention. To that end, the method of FIG. 13 will be described with reference to the example of FIG. 14.

Performing (1302) a reduce operation in the method of FIG. 13 includes transmitting (1304), by each task of a compute node other than the identified compute node (compute nodes $N_0$, $N_1$, $N_2$, $N_4$, and $N_5$), reduce data to the local root ($t_0$ of compute node $N_0$, $N_1$, $N_2$, $N_4$, and $N_5$) of the compute node through shared memory. Each task may also perform a reduction operation, such as bitwise OR operations, a logical AND operation, an XOR operation, or the like, prior to transmitting (1304) the reduce data.

Performing (1302) a reduce operation in the method of FIG. 13 also includes transmitting (1306), in parallel by each local root ($t_0$ of compute node $N_0$, $N_1$, $N_2$, $N_4$, and $N_5$) of a compute node other than the identified compute node, the reduce data to the task of the identified compute node assigned to be a parent of the local root. In the example of FIG. 14, task $t_0$ of compute node $N_0$ transmits reduce data to the task $t_1$ of compute node $N_3$, task $t_0$ of compute node $N_1$ transmits reduce data to the task $t_2$ of compute node $N_3$, task $t_0$ of compute node $N_2$ transmits reduce data to the task $t_3$ of compute node $N_3$, task $t_0$ of compute node $N_4$ transmits reduce data to the task $t_4$ of compute node $N_3$, and task $t_0$ of compute node $N_5$ transmits reduce data to the task $t_5$ of compute node $N_3$. Each task may also perform a reduction operation, such as bitwise OR operations, a logical AND operation, an XOR operation, or the like, prior to transmitting (1306) the reduce data.

Performing (1302) a reduce operation in the method of FIG. 13 continues by transmitting (1308), through shared memory by each of the tasks ($t_1$-$t_5$) of the identified compute node $N_3$, the reduce data to the global root ($t_0$). Each task may also perform a reduction operation, such as bitwise OR operations, a logical AND operation, an XOR operation, or the like, prior to transmitting (1308) the reduce data.

Readers will understand that although a broadcast, gather and reduce are described here, other collective operations may be carried out in a tree topology constructed in accordance with embodiments of the present invention. Such collective operations may include an allreduce operation, a scatter operation, a scattery operation, a gather operation, an alltoally operation, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for constructing a logical tree topology in a parallel computer, the parallel computer comprising a plurality of compute nodes, each compute node executing a number of tasks, wherein at least one compute node executes a number of tasks that is different than the number of tasks executed by another one of the compute nodes, the apparatus comprising a computer processor, a computer memory operatively coupled to the computer processor, the computer memory having disposed within it computer program instructions that, when executed by the computer processor, cause the apparatus to carry out:

identifying a compute node from the plurality of compute nodes executing a greatest number of tasks;

selecting, as a global root in a logical tree topology, a task from the identified compute node, including assigning the task as a local root of the identified compute node and assigning each of the other tasks of the identified compute node as a child of the local root;

selecting, from each of the other compute nodes, one task to be a local root in the logical tree topology, including assigning each task other than the local root as a child of the local root; and assigning each local root of the other compute nodes to be a child of one of the tasks of the identified compute node other than the global root;

performing a reduce operation in the logical tree topology including:

transmitting, by each task of a compute node other than the identified compute node, reduce data to the local root of the compute node through shared memory, including performing a reduction operation on the reduce data;

transmitting, in parallel by each local root of a compute node other than the identified compute node, the reduce data to the task of the identified compute node assigned to be a parent of the local root, including performing the reduction operation on the reduce data; and transmitting, through shared memory by each of the tasks of the identified compute node, the reduce data to the global root including performing the reduction operation on the reduce data.

2. The apparatus of claim 1 wherein the steps of identifying a compute node, selecting a task from the identified compute node as a global root, selecting one task to be a local root from each of the other compute nodes, and assigning each local root of the other compute nodes to be a child are carried out upon establishment of an operational group of the tasks.

3. The apparatus of claim 1 wherein selecting, as a global root, a task from the identified compute node further comprises selecting, from the identified compute node, one of: the task having a lowest rank or the tasks having the highest rank.

4. The apparatus of claim 1, further comprising computer program instructions that, when executed by the computer processor, cause the apparatus to carry out the step of performing a broadcast operation in the logical tree topology including:

transmitting broadcast data by the global root to the other tasks of the identified compute node through shared memory;

transmitting the broadcast data by each of the other tasks of the identified compute node in parallel to the local root assigned as a child of the task; and transmitting the broadcast data by the local root of each of the other compute nodes to the other tasks of the local root's compute node through shared memory.

5. The apparatus of claim 1, further comprising computer program instructions that, when executed by the computer processor, cause the apparatus to carry out the step of performing a gather operation in the logical tree topology including:

transmitting, by each task of a compute node other than the identified compute node, gather data to the local root of the compute node through shared memory;

transmitting, in parallel by each local root of a compute node other than the identified compute node, the gather data to the task of the identified compute node assigned to be a parent of the local root; and transmitting, through shared memory by each of the tasks of the identified compute node, the gather data to the global root.

6. A computer program product for constructing a logical tree topology in a parallel computer, the parallel computer comprising a plurality of compute nodes, each compute node executing a number of tasks, wherein at least one compute node executes a number of tasks that is different than the number of tasks executed by another one of the compute nodes, the computer program product disposed upon a computer readable storage memory, the computer program product comprising computer program instructions that, when executed, cause a computer to perform operations comprising:

identifying a compute node for the plurality of compute nodes executing a greatest number of tasks;

selecting, as a global root in a logical tree topology, a task from the identified compute node, including assigning the task as a local root of the identified compute node and assigning each of the other tasks of the identified compute node as a child of the local root;

selecting, from each of the other compute nodes, one task to be a local root in the logical tree topology, including assigning each task other than the local root as a child of the local root; and assigning each local root of the other compute nodes to be a child of one of the tasks of the identified compute node other than the global root;

performing a reduce operation in the logical tree topology including:

transmitting, by each task of a compute node other than the identified compute node, reduce data to the local root of the compute node through shared memory, including performing a reduction operation on the reduce data;

transmitting, in parallel by each local root of a compute node other than the identified compute node, the reduce data to the task of the identified compute node assigned to be a parent of the local root, including performing the reduction operation on the reduce data; and transmitting, through shared memory by each of the tasks of the identified compute node, the reduce data to the global root including performing the reduction operation on the reduce data.

7. The computer program product of claim 6 wherein identifying a compute node, selecting a task from the identified compute node as a global root, selecting one task to be a local root from each of the other compute nodes, and assigning each local root of the other compute nodes to be a child are carried out upon establishment of an operational group of the tasks.

8. The computer program product of claim 6 wherein selecting, as a global root, a task from the identified compute node further comprises selecting, from the identified compute node, one of: the task having a lowest rank or the tasks having the highest rank.

9. The computer program product of claim 6, further comprising computer program instructions that, when executed, cause the computer to perform operations comprising:

performing a broadcast operation in the logical tree topology including:

transmitting broadcast data by the global root to the other tasks of the identified compute node through shared memory;

transmitting the broadcast data by each of the other tasks of the identified compute node in parallel to the local root assigned as a child of the task; and transmitting the broadcast data by the local root of each of the other compute nodes to the other tasks of the local root's compute node through shared memory.

10. The computer program product of claim 6, further comprising computer program instructions that, when executed, cause the computer to perform operations comprising:

performing a gather operation in the logical tree topology including:

transmitting, by each task of a compute node other than the identified compute node, gather data to the local root of the compute node through shared memory;

transmitting, in parallel by each local root of a compute node other than the identified compute node, the gather data to the task of the identified compute node assigned to be a parent of the local root; and transmitting, through shared memory by each of the tasks of the identified compute node, the gather data to the global root.

* * * * *